United States Patent [19]
Olofsson

[11] Patent Number: 6,164,242
[45] Date of Patent: Dec. 26, 2000

[54] METHOD OF REGULATING THE VACUUM LEVEL IN A MILKING APPARATUS, AND A MILKING APPARATUS

[75] Inventor: Hans Olofsson, Huddinge, Sweden

[73] Assignee: Alfa Laval Agri AB, Tumba, Sweden

[21] Appl. No.: 08/981,463
[22] PCT Filed: Jun. 26, 1996
[86] PCT No.: PCT/SE96/00840
  § 371 Date: Jan. 15, 1999
  § 102(e) Date: Jan. 15, 1999
[87] PCT Pub. No.: WO97/01270
  PCT Pub. Date: Jan. 16, 1997

[30] Foreign Application Priority Data

Jun. 26, 1995 [SE] Sweden .................................. 9502296

[51] Int. Cl.$^7$ .................................................. A01J 5/007
[52] U.S. Cl. .................................. 119/14.02; 119/14.44; 119/14.43; 119/14.08
[58] Field of Search .................. 119/14.08, 14.43, 119/14.44, 14.02

[56] References Cited

U.S. PATENT DOCUMENTS

| | | | |
|---|---|---|---|
| 4,664,601 | 5/1987 | Uchida et al. | 417/27 |
| 5,141,403 | 8/1992 | Guo et al. | 417/45 |
| 5,242,404 | 9/1993 | Conley et al. | 604/119 |
| 5,275,124 | 1/1994 | Van Der Lely et al. | 119/14.08 |
| 5,595,477 | 1/1997 | Amlinger | 417/69 |
| 5,613,514 | 3/1997 | Tan et al. | 137/102 |
| 5,624,394 | 4/1997 | Barnitz et al. | 604/67 |
| 5,860,388 | 1/1999 | Tan et al. | 119/14.44 |
| 5,992,347 | 11/1999 | Innings et al. | 119/14.07 |
| 6,009,832 | 1/2000 | Innings et al. | 119/14.02 |

FOREIGN PATENT DOCUMENTS

| | | |
|---|---|---|
| 040769 | 5/1981 | European Pat. Off. . |
| 2035243 | 1/1972 | Germany . |
| 4103718 | 9/1993 | Germany . |
| 155831 | 11/1902 | Switzerland . |
| 397135 | 2/1966 | Switzerland . |
| WO9109230 | 6/1991 | WIPO . |

Primary Examiner—Michael J. Carone
Assistant Examiner—James S. Bergin
Attorney, Agent, or Firm—Hovey, Williams, Timmons & Collins

[57] ABSTRACT

A milking apparatus includes a vacuum pump (1), a milking device (6) having at least one milking claw and teatcups (7, 12, 13) provided to be attached to an animal to be milked, and a conduit (5) connecting the milking claw and teatcups (7, 12, 13) to a suction side (2) of the vacuum pump and being adapted to transport a flow from the milking device (6). The vacuum pump (1) is of a dynamic type. Furthermore, a regulating device (22, 23, 24, 25) is adapted to maintain the vacuum level of the milking apparatus at a desired, constant value. Furthermore, the regulating device comprises a sensor (23) for sensing the actual vacuum level of the conduit (5) and a regulator adapted to control the vacuum level to the desired value by regulating the size of the flow through the conduit (5) and the vacuum pump (1) in response to the vacuum level sensed.

18 Claims, 3 Drawing Sheets

METHOD OF REGULATING THE VACUUM LEVEL IN A MILKING APPARATUS, AND A MILKING APPARATUS

BACKGROUND OF THE INVENTION

1. Field of the Invention

The present invention relates to a method of regulating the vacuum level in a milking apparatus comprising a vacuum pump, a milking device having at least one milking means to be attached to an animal to be milked, and a conduit for the transport of a flow of air and connecting the milking device to a suction side of the vacuum pump. Moreover, the invention relates to a milking apparatus, comprising a vacuum pump, a milking device having at least one milking means provided to be attached to an animal to be milked, and a conduit connecting the milking device to a suction side of the vacuum pump and being adapted to transport a flow of air from the milking device.

2. Description of the Prior Art

Regarding vacuum pumps, there are two predominant main types. The first type comprises deplacement pumps functioning by successively forming delimited gas volumes and transporting these under pressure increase through the pump. The second main type comprises dynamic pumps in which a gas is accelerated, whereafter the kinetic energy of the gas is transformed to pressure.

Conventionally, deplacement pumps are used in milking apparatuses as vacuum pumps to produce a vacuum in a vacuum conduit connected to conduits for transporting the milk. The milk is sucked from the cows being milked via these transport conduits to a milk receiving vessel. With regard to the comfort and the udder health of the cows, it is important that the vacuum level at the teats of the cow is maintained at a relatively constant predetermined desired value. This vacuum level is dependent on the vacuum level of the vacuum conduit and thus it is also important that the latter vacuum level (the vacuum level of the milking system) is as constant as possible. Because of this, the deplacement pump is dimensioned to have a certain over-capacity in order to enable compensation for leakage in the milking apparatus or for a sudden air flow through the conduit system, for example due to the fact that a teatcup has been released from its teat, and thus the vacuum level does not decrease but remain relatively constant at the desired value. This means that during normal milking only about 50% of the capacity of the deplacement pump is utilized whereas 100% of the effect of the pump is utilized in order to provide sufficient reserve for the milking apparatus. The desired vacuum level, normally about 50 kPa, is maintained by means of a vacuum regulator letting in an appropriate air flow in the vacuum conduit. A disadvantage of this conventional way of regulating the vacuum level is that the deplacement pump normally consumes more energy than necessary since it always runs at full effect.

Moreover, it is not appropriate to regulate the vacuum level by controlling the rotational speed of a deplacement pump and in this manner obtain a lower energy consumption, since such a control is too slow and would result in unacceptable vacuum fluctuations.

SUMMARY OF THE INVENTION

The object of the present invention is to reduce the energy consumption of a milking apparatus.

This object is obtained by the method initially defined and characterized in that the vacuum pump is of a dynamic type, that the actual vacuum level in the conduit is sensed and that the size of the flow through the conduit is regulated in response to the vacuum level sensed in order to adjust the vacuum level to a desired value.

A dynamic vacuum pump can be designed in such a manner that the effect supply, at least within a certain flow interval, is reduced with a decreasing flow through the vacuum pump, whereas the pressure ratio remains essentially constant within this flow interval. Thus, by choosing such a dynamic vacuum pump for a milking apparatus, the possibilities to regulate the vacuum level of the milking apparatus may be improved. Preferably, this regulation may be performed by, for instance, a slight increase of the pressure ratio between the outlet and the inlet, e.g. by throttling the inlet, such that the flow through the vacuum pump will decrease and the effect supplied is reduced, resulting in a lower energy consumption.

According to one embodiment, the size of the flow may be regulated by adjusting the free flow area of the conduit. Preferably, this may be realized by means of a throttle valve known per se.

According to another embodiment, the size of the flow may be regulated by controlling the direction of the flow at the inlet of the vacuum pump. This may be realized by means of guide blades. The latter embodiment results in a greater effect reduction since the pressure ratio across the vacuum pump is smaller.

According to a further embodiment, the vacuum level may also be regulated by the supply of a further flow to the conduit and the vacuum pump. In this case the regulation is preferably performed in such a manner that if the vacuum level, despite the regulation of the size of the flow to a minimum level, exceeds a desired value, the supply of the further flow is increased. In this way the security of the system is enhanced, i.e. if a throttling of the flow delivered to the vacuum pump is not sufficient for maintaining the vacuum level at a desired level, air, for instance, may be supplied to the conduit from the atmosphere.

The object stated above is also obtained by the milking apparatus initially defined and characterized in that the vacuum pump is of a dynamic type and that the apparatus comprises a control device provided to maintain the vacuum level at a desired level.

Advantageous embodiments of the milking apparatus are defined in the claims 7 to 15.

BRIEF DESCRIPTION OF THE DRAWINGS

The present invention will now be explained more closely with reference to different embodiments illustrated in the drawings enclosed.

DETAILED DESCRIPTION OF DIFFERENT EMBODIMENTS

Figure 1:
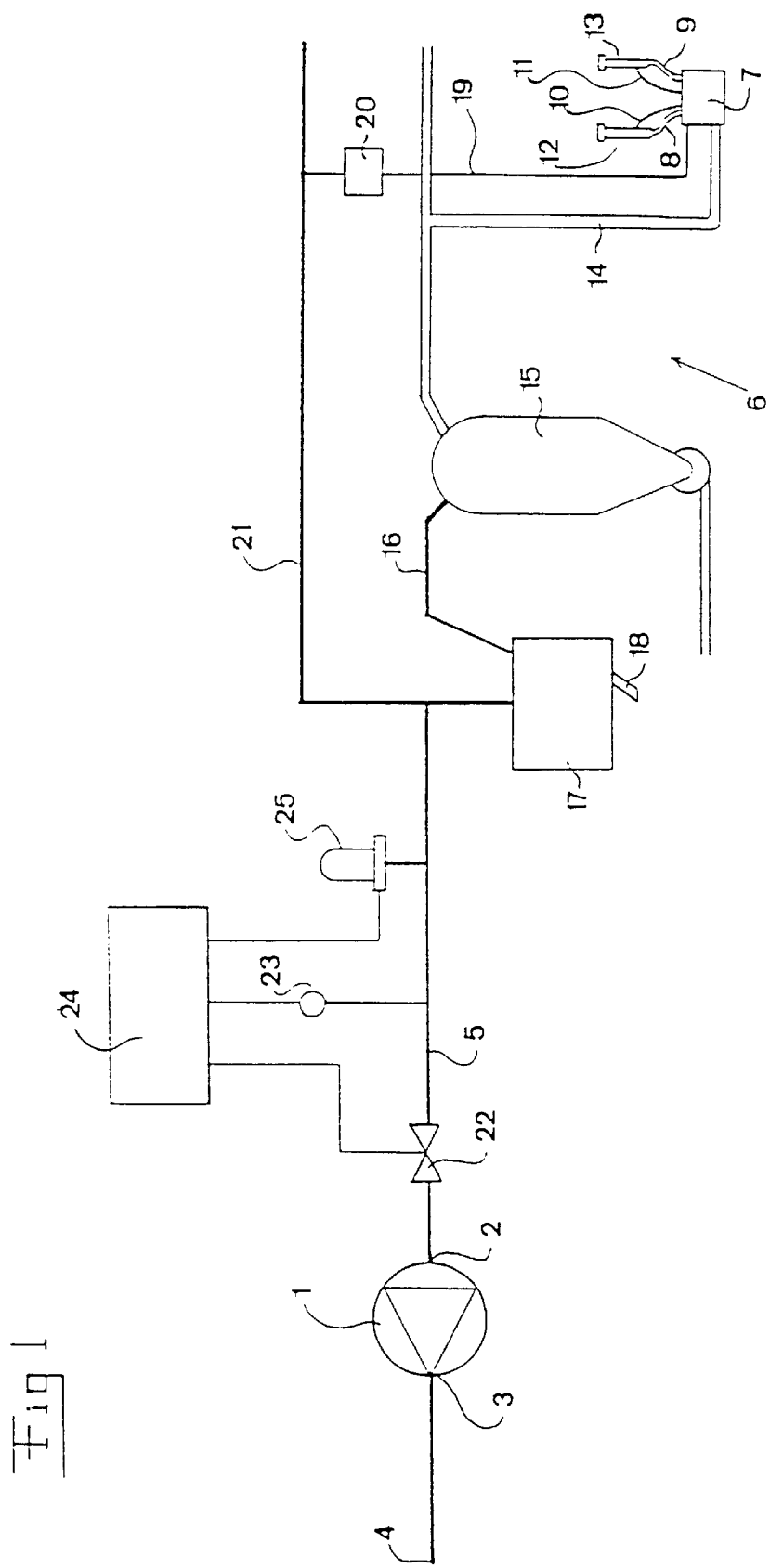
FIG. 1 shows a schematic view of a milking apparatus.

In FIG. 1 a milking apparatus, comprising a vacuum pump 1 having a suction side 2 and a pressure side 3, is partly disclosed. The pressure side 3 is possibly, via an oil separator and a silencer (not shown), connected to an outlet 4 connected to the atmosphere. The vacuum pump 1 is of a dynamic type, and preferably a so called radial compressor, which by means of blades, guides the incoming air at the suction side 2 radially outwards, thereby accelerating the air in radial direction by means of the centrifugal force. Thereafter, the remaining kinetic energy of the air is transformed by means of a diffuser to a pressure, such that the pressure ratio between the pressure side 3 and the suction side 2 of the vacuum pump 1 lies between about 1.7 and 2.7, preferably about 2.0. In order to produce this pressure ratio, the vacuum pump 1 may comprise one or more compressor stages. Other types of dynamic vacuum pumps may also be utilized, for example an axial compressor.

A suction side 2 of the vacuum pump 1 is via a vacuum conduit 5 connected to a milking device 6. The milking device 6 comprises a claw 7 which, via milk tubes 8 and 9, and pulse tubes 10 and 11, is connected to two teatcups 12 and 13 provided to be attached to the teats of an animal, such as a cow, to be milked. Of course, the milking device 6 may comprise more than one claw 7 and each claw 7 may be connected to more than two, in case of cows four teatcups 12, 13. From the claw 7 the milk is transported by a milk tube 14 to a receiving vessel 15. The receiving vessel 15 is, via a vacuum tube 16, connected to a separating means 17 connected to the vacuum conduit 5 and provided to prevent that liquid is introduced in the vacuum conduit 5. The separating means 17 comprises a drainage means 18 for intermittently removing separated liquid. Furthermore, the claw 7 is, via a pulse tube 19, connected to a pulsator 20 connected to the vacuum conduit 5 via a vacuum conduit 21.

Thus, the vacuum pump 1 sucks a flow of air from the milking device 6 via the vacuum conduit 5 and the separating means 17. Via the vacuum conduit 21 and the pulsator 20 a pulsating subpressure is produced in a known manner in a pulsating chamber (not shown) of each teatcup 12, 13. This pulsating subpressure varies during a pulsation cycle, for instance between atmospheric pressure and about 50 kPa, i.e. the maximum vacuum level of the pulsating vacuum is 50 kPa. Via the vacuum tube 16, an subpressure is produced in the receiving vessel 15, the milk tube 14 and in an inner, teat-receiving space (not shown) of each teatcup 12, 13. This subpressure is for instance about 50 kPa, i.e. in the inner space of the teatcups 12, 13, the claw 7, the milk tube 14 and the receiving vessel 15, there is a milking vacuum of a vacuum level of about 50 kPa. By means of this milking vacuum, milk is sucked from the teats to the receiving vessel 15.

In order to regulate the milking vacuum such that a constant desired level, e.g. 50 kPa, is maintained, and the pulsating vacuum such that the maximum pulsating vacuum in each pulsation cycle amounts to the desired level, e.g. 50 kPa, a regulating valve 22 is provided on the vacuum conduit 5. The regulating valve 22 may be designed in many different, known manners to regulate the size of the flow through the vacuum conduit 5 and the vacuum pump 1. In this embodiment, it is designed as a throttle valve which by reducing the free flow area throttles the flow through the vacuum conduit 5 and the vacuum pump 1. However, the regulating valve 22 should be of a quick operating type, i.e. it should be possible, in a very short period of time, to adjust the free flow area from a minimum to a maximum and vice versa. By the flow is meant the total quantity of air passing through the vacuum conduit 5 and the vacuum pump 1 per unit of time. A regulating valve 22 may be provided on the conduit 5 or on the suction side of the vacuum pump 1 at the inlet of the vacuum pump 1. Furthermore, a pressure sensor 23 is provided for sensing the pressure or the vacuum level in the vacuum conduit 5. A pressure sensor 23 is connected to an electronic control unit 24 which in turn is connected to the regulating valve 22 for controlling the opening rate thereof in response to the vacuum level sensed. Furthermore, a regulator 25 is provided on the vacuum conduit 5 and adapted to supply a further flow from the atmosphere to the vacuum conduit 5 in order to increase the flow through the vacuum pump 1. The regulator 25 is also connected to the electronic control unit 24. The regulator 25 should be controlled to let in as much air that the air flow through the vacuum pump 1 is not below the working range of the vacuum pump 1.

According to an alternative embodiment, guide blades adjustable by means of the control unit 24 may be provided at the inlet of the vacuum pump 1 instead of the regulating valve 22, and by which the direction of the flow towards the rotor may be controlled, and consequently the size of the flow through the vacuum conduit 5 may be influenced.

Figure 2:
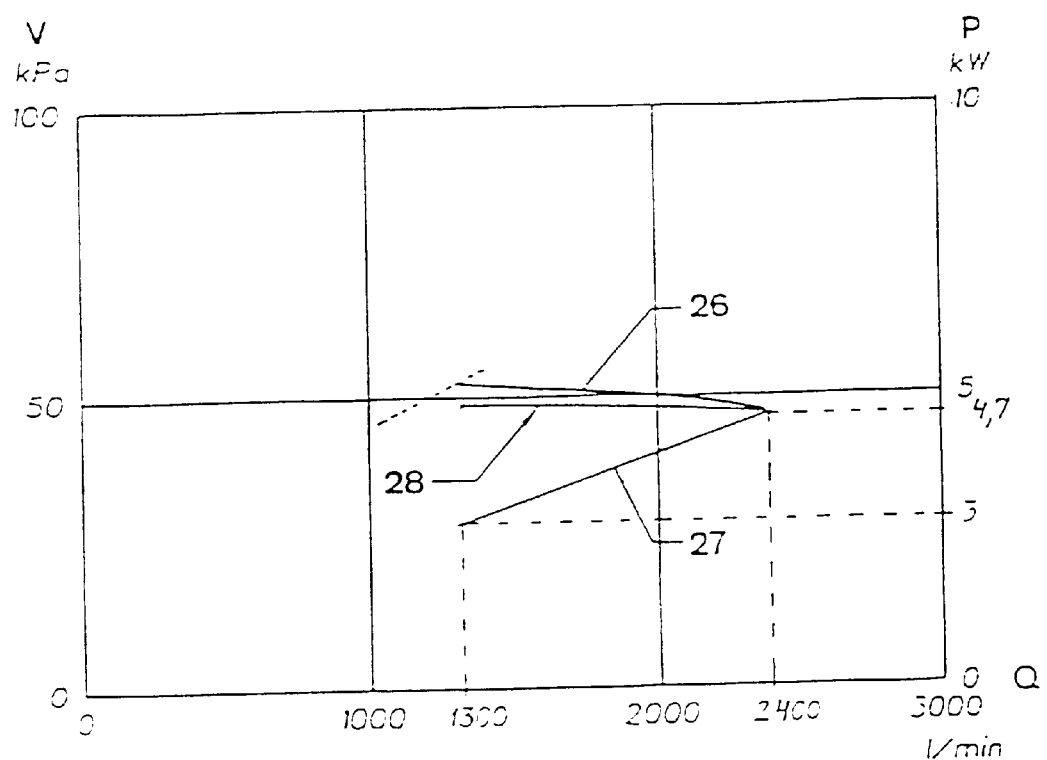
FIG. 2 shows a diagram of the vacuum level and the shaft effect in relation to the flow of the vacuum pump used according to the invention.
Figure 3:
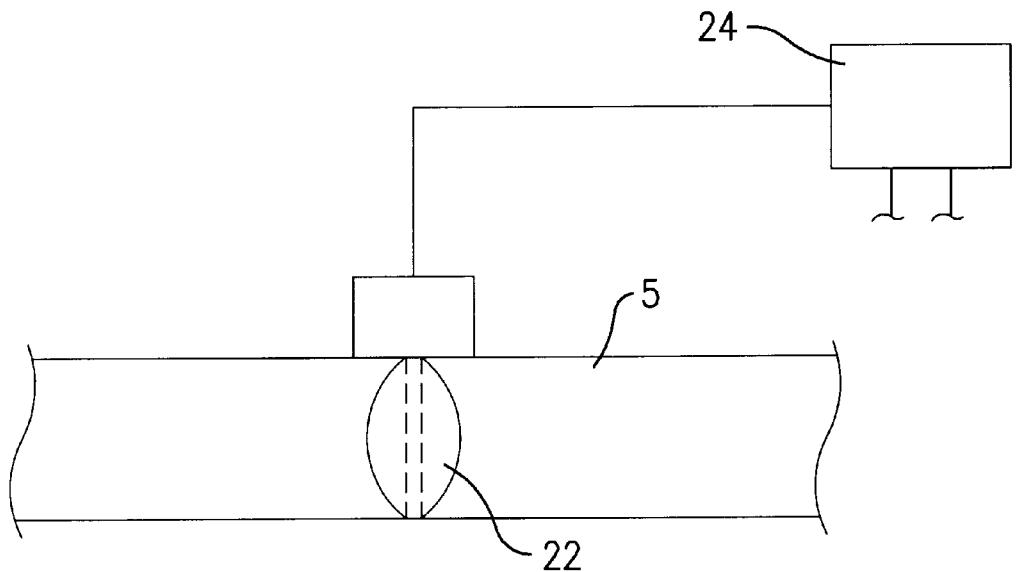
FIG. 3 is a diagrammatic view of a throttle valve which permits the size of the flow through the conduit to be regulated.
Figure 4:
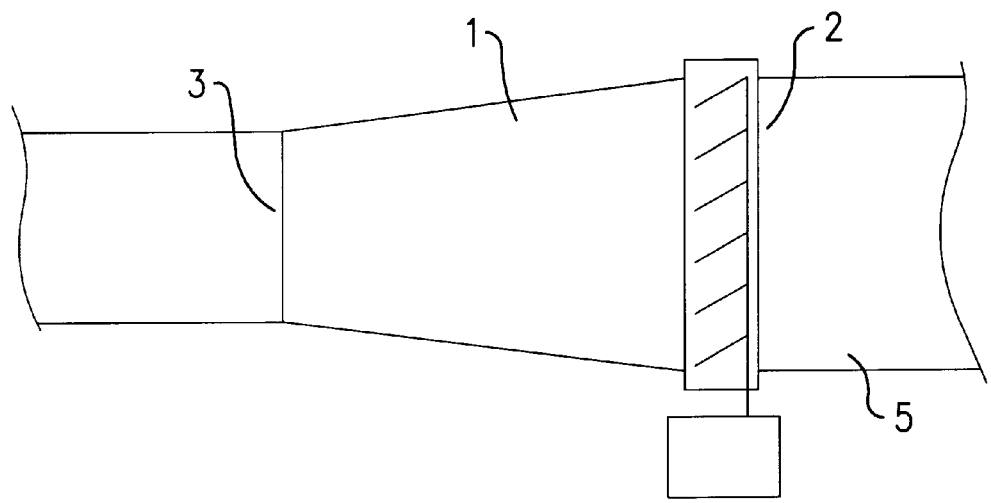
FIG. 4 is a diagrammatic view of the arrangement of the guide blades at the inlet of the compressor for regulating the size of the flow through the conduit and the compressor.

The dynamic vacuum pump 1 possesses the properties disclosed in the diagram of FIG. 2, the horizontal axis representing the flow Q, in litre per minute, the left vertical axis representing the vacuum level V, in kPa, and the right vertical axis representing the shaft effect P, in kW. The upper curve 26 shows, as a function of the flow Q, the vacuum level V at the inlet of the vacuum pump 1 and the lower curve 27 shows the shaft effect P, as a function of the flow Q. The curve 28 shows the vacuum level in the vacuum conduit 5. As disclosed in the diagram, the vacuum level in the vacuum conduit 5 may be maintained relatively constant within a range of about 1 kPa on a desired level of about 50 kPa within a flow interval of about 1300–2400 l/min. Thereby, it is shown that if the flow through the vacuum pump 1 decreases from 2400 to 1300 l/min, also the effect needed by the vacuum pump 1 is decreasing from about 4.7 kW to 3 kW. This characteristic of the dynamic vacuum pump 1 may be utilized such that in normal circumstances the flow to the vacuum pump 1 may be throttled such that the pump operates with a relatively low capacity of about 1300 l/min and with a corresponding relatively low effect and energy consumption. This means that in normal circumstances the regulator 25 may be essentially closed or only letting in a very little further flow to the vacuum conduit 5 and small fluctuations in the vacuum level may be compensated for by means of the regulating valve 22.

If air for any reason would leak in anywhere in the milking apparatus this is sensed by the pressure sensor 23, and the control unit 24 closes the regulator 25 completely in a first regulating step. If this is not sufficient for compensating for the leakage, the control unit 24 increases the opening rate of the regulating valve 22 in a second regulating step, thereby increasing the capacity of the dynamic vacuum pump 1.

In case the regulating valve 22 is already adjusted to a minimum opening rate and the vacuum level exceeds the desired level, the level will be sensed by the pressure sensor 23 and the control unit 24 adjust the regulator 25 to increase the supply of the further flow to the vacuum conduit 5.

Consequently, as is disclosed in the diagram of FIG. 2, the effect consumption may be decreased by 1.7 kW or 36% by throttling the flow from 2400 l/min, which is a capacity reduction of 46%. Since the vacuum pump of a milking apparatus in many cases is utilized during essentially the whole day and night, this effect reduction results in a significant energy gain.

What is claimed is:

1. A method of regulating the vacuum level in a milking apparatus comprising a vacuum pump, a milking device having at least one milking means to be attached to an animal to be milked, and a conduit connecting the milking device to a suction side of the vacuum pump for the transport of a flow of air from the milking device to the vacuum pump, wherein the vacuum pump is of a dynamic type arranged to accelerate the air and to transfer the kinetic energy of the air to pressure, comprising the steps of:

sensing the actual vacuum level in the conduit; and regulating the rate of the flow through the conduit and through the vacuum pump in response to the vacuum level sensed in order to adjust the vacuum level to a desired value.

2. A method according to claim 1, wherein the rate of the flow is regulated by adjusting the free flow area of the conduit.

3. A method according to claim 1, wherein the vacuum pump is provided with an inlet having guide blades and the rate of the flow is regulated by controlling the direction of the flow by means of the guide blades in the inlet of the vacuum pump.

4. A method according to claim 3, including the step of regulating the vacuum level by the supply of a further flow of air to the conduit and the vacuum pump.

5. A method according to claim 1, wherein the vacuum level is also regulated by the supply of a further flow of air to the conduit and the vacuum pump.

6. A method according to claim 5, wherein if the sensed vacuum level, despite the regulation of the rate of the flow to a minimum value, exceeds the desired value, the supply of the further flow is increased.

7. A milking apparatus comprising:

a vacuum pump;

a milking device having at least one milking means provided for attachment to an animal to be milked; and a conduit connecting the milking device to a suction side of the vacuum pump and being adapted to transport a flow of air from the milking device to the vacuum pump, wherein the vacuum pump is of a dynamic type arranged to accelerate the air and to transfer the kinetic energy of the air to pressure and the apparatus comprises a control device comprising means for sensing the actual vacuum level in the conduit and a first regulating means adapted to control the vacuum level to a desired value by regulating the size of the flow through the conduit and through the vacuum pump in response to the vacuum level sensed.

8. A milking apparatus according to claim 7, wherein the first regulating means is adapted to regulate the rate of the flow by adjusting the free flow area of the conduit at least at one location.

9. A milking apparatus according to claim 8, wherein the first regulating means comprises a throttle valve.

10. A milking apparatus according to claim 7, wherein the first regulating means is adapted to regulate the rate of the flow by the control of the flow direction into the vacuum pump.

11. A milking apparatus according to claim 10, wherein the first regulating means comprises guide blades at the inlet of the vacuum pump.

12. An apparatus according to claim 11, wherein the control device comprises a second regulating means for increasing and decreasing, respectively, the supply of a further flow of air through the conduit and the vacuum pump in response to the vacuum level sensed by the sensing means.

13. A milking apparatus according to claim 7, wherein the control device comprises a second regulating means adapted to increase and decrease, respectively, the supply of a further flow of air through the conduit and the vacuum pump in response to the vacuum level sensed.

14. A milking apparatus according to claim 13, wherein the control device comprises a control unit connected to said sensing means on one hand and to the first and second regulating means on the other hand for producing an increase of the supply of the further flow if the vacuum level exceeds the desired value despite the regulation of the size of the flow to a minimum value.

15. A milking apparatus according to claim 14, wherein the sensing means comprises a presssure sensor adapted to sense the vacuum level in the conduit and connected to the control unit.

16. An apparatus according to claim 15, wherein the dynamic vacuum pump is a radial compressor.

17. An apparatus according to claim 14, wherein the sensing means comprises a pressure sensor for sensing the vacuum level in the conduit and operatively connected to the control unit.

18. A milking apparatus according to claim 7, wherein the dynamic vacuum pump is a radial compressor.

* * * * *